United States Patent
Goodzeit et al.

(10) Patent No.: US 11,053,029 B1
(45) Date of Patent: Jul. 6, 2021

(54) MODULAR HIGH THERMAL CAPACITY SPACECRAFT

(71) Applicant: Lockheed Martin Corporation, Bethesda, MD (US)

(72) Inventors: Neil Evan Goodzeit, Woodside, CA (US); Herbert H. Vichnin, King of Prussia, PA (US); Matthew T. Gallen, Castle Rock, CO (US)

(73) Assignee: LOCKHEED MARTIN CORPORATION, Bethesda, MD (US)

( * ) Notice: Subject to any disclaimer, the term of this patent is extended or adjusted under 35 U.S.C. 154(b) by 656 days.

(21) Appl. No.: 15/945,639

(22) Filed: Apr. 4, 2018

(51) Int. Cl.
*B64G 1/58* (2006.01)
*B64G 1/64* (2006.01)

(52) U.S. Cl.
CPC ............... *B64G 1/58* (2013.01); *B64G 1/641* (2013.01)

(58) Field of Classification Search
CPC .................................. B64G 1/58; B64G 1/641
See application file for complete search history.

(56) References Cited

U.S. PATENT DOCUMENTS

| | | | | |
|---|---|---|---|---|
| 5,823,476 A * | 10/1998 | Caplin | ................... | B64G 1/428 244/158.1 |
| 6,027,077 A * | 2/2000 | Eller | ..................... | B64G 1/22 244/171.8 |
| 7,270,302 B1 * | 9/2007 | Wong | ...................... | B64G 1/50 244/171.8 |
| 7,413,148 B2 * | 8/2008 | Behrens | ................. | B64G 1/402 244/172.2 |
| 7,967,256 B2 * | 6/2011 | Wong | ................ | H01M 10/6552 244/171.8 |
| 8,157,217 B1 * | 4/2012 | Anderson | ............... | B64G 1/503 244/171.8 |
| 8,820,684 B2 * | 9/2014 | McKinnon | ............. | B64G 1/506 244/171.8 |
| 9,296,496 B2 * | 3/2016 | Bullard | .................... | B64G 1/50 |

\* cited by examiner

*Primary Examiner* — Valentina Xavier
(74) *Attorney, Agent, or Firm* — Morgan, Lewis & Bockius LLP

(57) ABSTRACT

A modular spacecraft is provided. The modular spacecraft includes a bus module and a payload module. The bus module provides additional thermal radiative capacity for the payload module by including a bus-panel payload thermal zone that couples operational components of the payload module to a radiator panel in the bus module. The bus module also includes its own operational components that are thermally coupled to the radiator panel but that are thermally isolated from the payload module and the bus-panel payload thermal zone.

14 Claims, 3 Drawing Sheets

MODULAR HIGH THERMAL CAPACITY SPACECRAFT

FIELD

The present disclosure generally relates to spacecraft and in particular to, for example, a modular high thermal capacity spacecraft.

BACKGROUND

For spacecraft such as Geo-synchronous Earth-Orbit (GEO) spacecraft, it can be challenging to provide sufficient thermal control for higher power payloads, particularly without violating launch vehicle constraints on the spacecraft's size and shape.

The description provided in the background section should not be assumed to be prior art merely because it is mentioned in or associated with the background section. The background section may include information that describes one or more aspects of the subject technology.

SUMMARY

In one or more implementations, a spacecraft is provided that includes a payload module, including payload module operational components. The spacecraft also includes a bus module. The bus module is attached to the payload module and includes bus module operational components, first thermal routing structures that are thermally coupled to the bus module operational components, and second thermal routing structures that are thermally coupled to the payload module operational components and thermally isolated from the bus module operational components.

In one or more implementations, a bus module for a spacecraft is provided, the bus module including a mechanical interface for coupling to a payload module, a radiator structure for dissipating heat to space, an operational component, and a first thermal routing network arranged to route heat from the operational component to the radiator structure. The bus module also includes a second thermal routing network that is arranged to route heat to the radiator structure and that is thermally isolated from the first thermal routing network and the operational component.

In one or more implementations, a spacecraft is provided that includes a bus module. The bus module includes a mechanical interface for a payload module, a first thermal zone, and a second thermal zone. The second thermal zone is thermally isolated from the first thermal zone and configured to be thermally coupled to the payload module when the payload module is attached at the mechanical interface.

It is to be understood that both the foregoing general description and the following detailed description are exemplary and explanatory and are intended to provide further explanation of the subject technology as claimed. It is also to be understood that other aspects may be utilized and changes may be made without departing from the scope of the subject technology.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments.

In the drawings.

DETAILED DESCRIPTION

Figure 1:
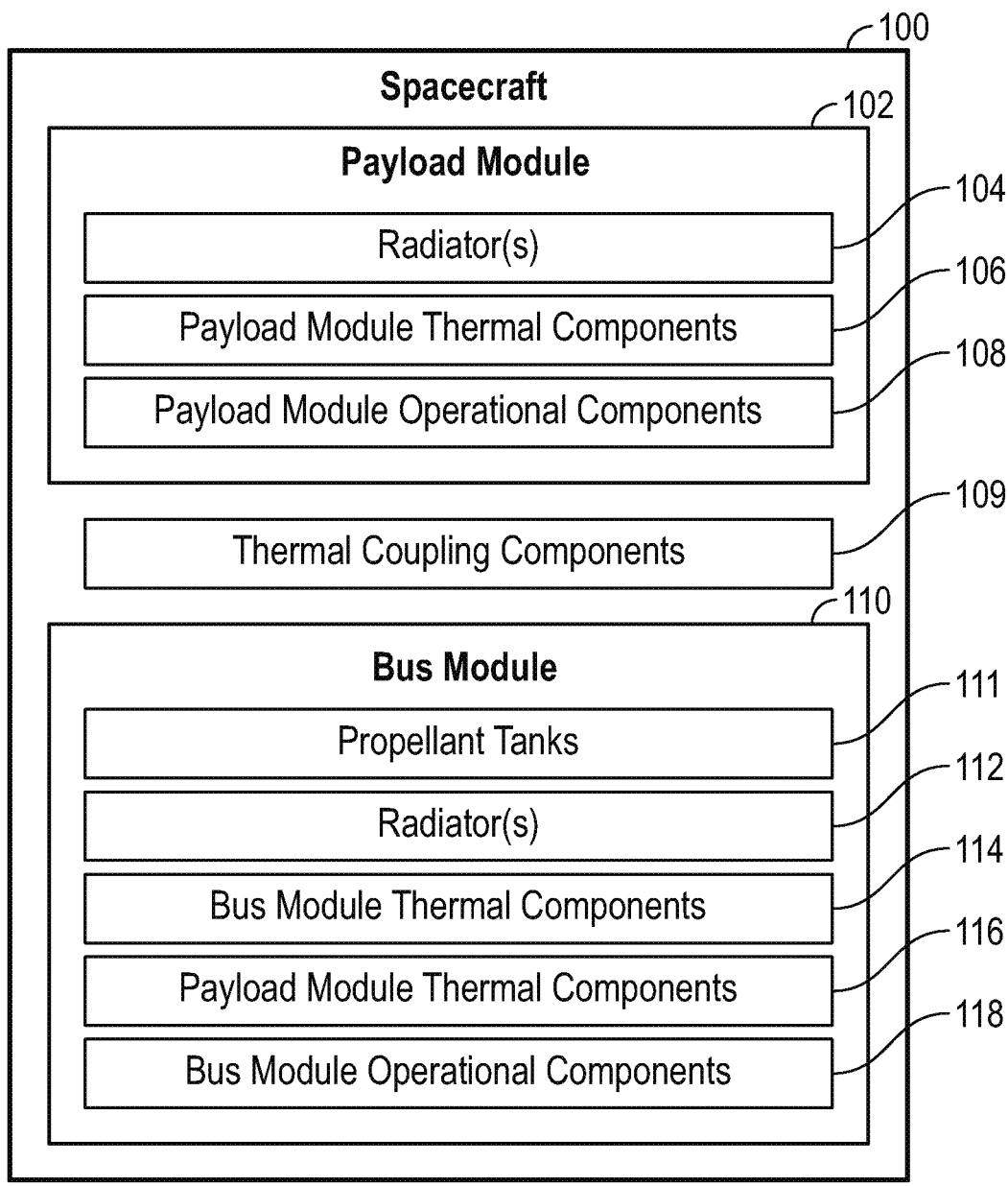
FIG. 1 illustrates a block diagram of an example spacecraft, in accordance with aspects of the disclosure.

Spacecraft such as Geo-synchronous Earth-Orbit (GEO) spacecraft are continually desired to accommodate higher power payloads that operate at lower temperatures for increased reliability. Furthermore, spacecraft that are adaptable to different payloads with reduced cost and processing time are desired. One solution to address these needs is to provide separate bus and payload modules.

For example, a bus module can include avionics and a propulsion system, and the payload module can include sensors and support electronics. Communications equipment for the spacecraft, including any digital processors, may be distributed between the bus and the payload modules. Modules that are thermally independent may be provided so that the modules can be integrated and tested in parallel, and then mated prior to launch.

In some scenarios, the payload module can have sufficient equipment mounting area for the payload components, but cannot be made large enough to provide the radiator area necessary for acceptably low temperatures. This is because, for example, the bus module's minimum height is often determined by propellant tanks therein, and thus the payload module can only be made so tall before encountering the tapered section of a launch vehicle fairing. Furthermore, making the payload module unnecessarily tall may result in a significant structure mass penalty.

In some scenarios, an increase in payload module thermal capacity can be provided by including deployable radiator panels on the payload module. However, deployable components have a disadvantage in terms of cost, complexity, and increased mass. Deployable radiator panels can interfere with antennas or sensor field-of-views, limiting the ability to accommodate different payloads. Alternatively, an east/west radiator system may be used. However, east/west radiator systems generally provide only marginal benefit for GEO spacecraft due to solar impingement and restricted thermal view factors.

In accordance with various aspects of the subject disclosure, an improved modular spacecraft is provided that addresses the payload module thermal limitation. In particular, in some scenarios, excess thermal capacity may exist in the bus module. In accordance with various aspects of the subject disclosure, this excess thermal capacity is made accessible to the payload module in a way that preserves thermal independence of the payload and bus equipment.

The bus module includes thermal radiation structures (e.g., one or more thermal radiator surfaces or outboard facesheets of one or more equipment panels), and thermal routing structures (e.g., one or more heat pipe networks embedded within each equipment panel between an inboard facesheet to which operational components are mounted and an outboard facesheet that forms the radiator surface). Some of the thermal routing structures of the bus module route heat from bus module operational components to the thermal radiation structures of the bus module. Others of the thermal routing structures of the bus module are arranged to route heat from the payload module to the bus module thermal radiation structures. Bus module operational components are thermally isolated from the payload module and the thermal routing structures that route heat therefrom. The bus module operational components are mounted to the inboard facesheet of the bus module equipment panel and thermally coupled to the bus module thermal radiation structures by others of the thermal routing structures.

More specifically, in one example, the bus module includes two bus module equipment/radiator panels that are arranged for equipment mounting, waste heat transport, and to radiate waste heat to space (e.g., a North Panel and a South Panel in which, in orbit, the North Panel faces North and the South Panel faces South). Equipment for the bus module (e.g., one or more bus module operational components) mounts to the inboard side of the panel (e.g., to an inboard facesheet of the panel), and the outboard side (e.g., an outboard facesheet) comprises a thermal radiator surface that may include optical solar reflectors or white paint, to promote thermal radiation and reject solar heat input. For each bus radiator panel, there are two (or more) independent heat pipe networks (thermal routing structures) embedded in the panel. At least one network (noting that there could be more than one) is dedicated to the bus equipment, and another thermally isolated (e.g., physically separate) network is coupled to a payload module radiator/equipment panel after the modules are mechanically attached. In this way, the bus module provides additional thermal control for the payload while maintaining the thermal isolation between bus module and payload module components.

FIG. 1 shows an example of a spacecraft 100 including a payload module 102 and a bus module 110. As shown in FIG. 1, payload module 102 includes payload module operational components 108 such as electrical components, computing components, communications components, sensors, or other functional electronic and/or mechanical components or systems for performing the payload module's intended operations in space.

Because some or all of the payload module operational components 108 generate heat during operation, and because the payload module operational components 108 may have desired or required operating temperatures or operating temperature ranges, the temperature at various locations within payload module 102 (including the temperature of one or more of payload module operational components 108) may be maintained (at least in part) using payload module thermal routing structures such as payload module thermal components 106.

Radiators 104 may be mounted to, or may form, one or more external surfaces of payload module 102 so that heat from payload module 102 can be radiated to space by radiators 104. For example, radiators 104 may include outboard facesheets of one or more equipment panels of the payload module. Payload module operational components 108 may be mounted to an internal surface of the equipment panels (e.g., to an inboard facesheet of the panel). Payload module thermal components 106 may include thermal routing elements such as heat pipes (e.g., embedded within each equipment panel between the inboard and outboard facesheets or otherwise mounted to the equipment panels) that route heat from payload module operational components 108 to one or more radiators 104. Payload module operational components 108 that are mounted to an equipment panel may be thermally coupled to the thermal routing structures associated with that panel, through the inboard facesheet of that panel.

As shown in FIG. 1, bus module 110 includes bus module operational components 118. Bus module operational components 118 may include power regulation and distribution components, remote interface electronics units, attitude-control components such as gyroscopes and reaction wheels, communications equipment, and electric propulsion power processors. Bus module 110 also includes thrusters (e.g., Hall Current Thrusters and/or mono or bi-propellant thrusters) and propellant tanks 111 for storing and providing propellant to the thrusters for velocity change maneuvers and attitude control of the spacecraft 100.

Some or all of bus module operational components 118 may also generate heat. Heat generated by bus module operational components 118 is routed to bus module radiator(s) 112 via bus module thermal routing structures such as bus module thermal components 114. Bus module operational components 118 may be mounted to an inboard facesheet of an equipment panel of the bus module. Bus module radiator(s) 112 may include outboard facesheets of the bus module equipment panels. Bus module thermal components 114 may include thermal routing elements such as heat pipes embedded within the equipment panels that route heat from bus module operational components 118 to one or more radiators 112 (e.g., via the inboard facesheet to which the operational components are mounted).

Due to various restrictions and/or requirements with respect to the size and configuration of the payload module 102 and bus module 110, radiator(s) 104 on payload module 102 may be insufficient for radiating the heat from payload module 102.

In order to provide additional thermal control for payload module 102, one option would be to increase the size of the payload module to provide larger or additional radiators 104. However, the size of the payload module is often constrained by the need for the payload module and the attached bus module to be accommodated in a launch vehicle for transport to space. In some circumstances, deployable radiators can be provided on payload module 102 so that a larger radiative area can be provided while still conforming to the size constraints for accommodation in the launch vehicle. Such radiators are stowed (folded) for launch, and then deploy to a position roughly parallel to the fixed radiator panels on orbit. Deployable components, however, increase cost and complexity in addition to adding additional mechanical failure modes for the payload module.

In accordance with some aspects of the subject disclosure, in order to provide additional thermal control for payload module 102, without the need for deployable radiators and while maintaining compliance with launch vehicle constraints, spacecraft 100 includes thermal coupling components 109 that thermally couple payload module operational components 108 to thermal routing structures such as payload module thermal components 116 disposed in bus module 110. Payload module thermal components 116 in bus module 110 may include thermal routing structures such as heat pipes or loop heat pipes (e.g., embedded within bus module equipment panels) that are thermally coupled to radiators 112 on bus module 110. Thermal coupling components 109 may include heat pipes, loop heat pipes, thermal straps, thermal-mechanical joints, or other thermal conductors that thermally couple payload module thermal components 106, radiator(s) 104, and/or payload module operational components 108 to payload module thermal components 116 in bus module 110. In this way, radiators 112 of bus module 110 can be used to radiate heat from, and control the temperature of payload module operational components 108 and bus module operational components 118.

Bus module thermal components 114 and payload module thermal components 116, both disposed on or within bus module 110, may be thermally isolated from each other so that heat is not exchanged between payload module operational components 108 and bus module operational components 118. Also, note there are no payload components directly attached to the bus payload module thermal components or to any bus module equipment panel—all of the payload operational components reside in the payload module. Bus module 110 having payload module thermal components 116 can provide additional freedom for payload designers to include improved (e.g., high speed, high bandwidth) electronics for payload module 102 without increasing the size of payload module 102 beyond the constraints for launch vehicle accommodation.

Thermal coupling components 109 may be separate thermal coupling structures such as external heat pipes that thermally and/or mechanically couple payload module thermal components 106 and/or payload module operational components 108 of payload module 102 to payload module thermal components 116 of bus module 110. However, in some scenarios, spacecraft 100 may be provided without separate thermal coupling components 109 (e.g., by providing thermal contacts on each of payload module thermal components 106 of payload module 102 and payload module thermal components 116 of bus module 110, so that payload module thermal components 106 of payload module 102 and payload module thermal components 116 of bus module 110 are placed into thermal contact merely by the mechanical coupling of payload module 102 to bus module 110). Although not explicitly shown in FIG. 1, spacecraft 100 also includes mechanical coupling components by which payload module 102 and bus module 110 are mechanically attached prior to launch.

Figure 2:
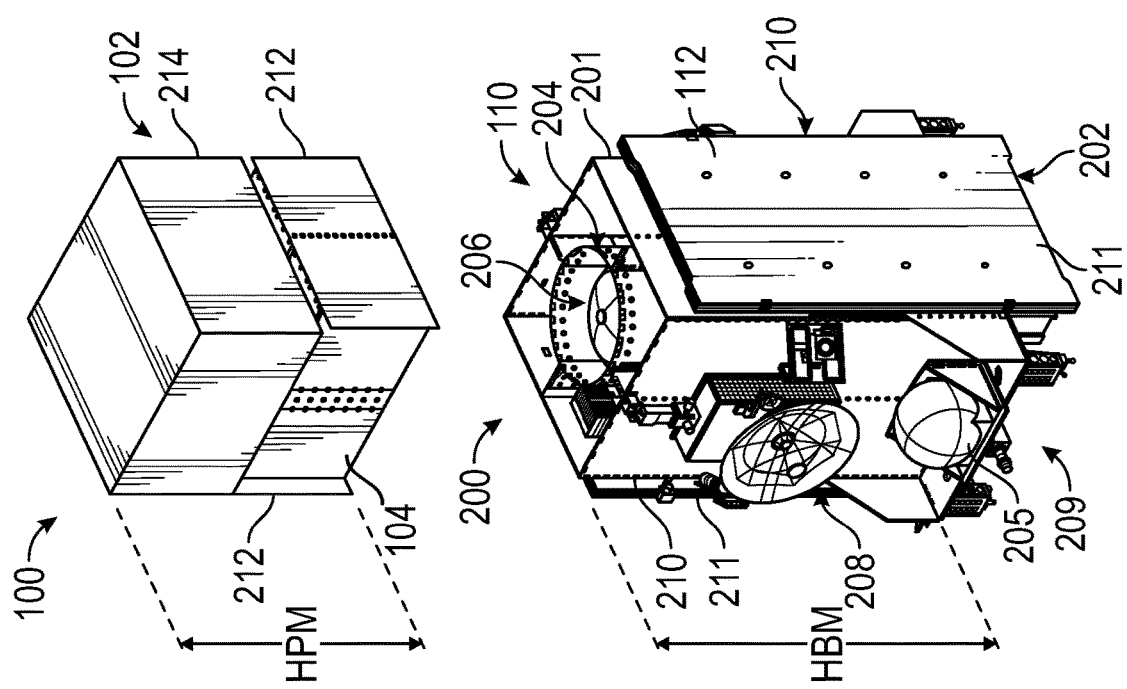
FIG. 2 illustrates a perspective view of a spacecraft having a bus module and a payload module prior to mating of the modules, in accordance with aspects of the disclosure.

FIG. 2 shows a top perspective view of an illustrative implementation of spacecraft 100, before payload module 102 and bus module 110 are attached. As shown in FIG. 2, payload module 102 has a payload module height HPM that may be constrained by the mounting area needed for payload module operational components 108 such as payload electronics. Bus module 110 has a bus module height HBM that may be determined by the size of the propellant tanks 111 (see FIG. 1) that reside inside a core structure 204 (e.g., a core cylinder). In the example of FIG. 2 propellant tanks 111 are implemented as a single central fuel tank 206 and additional tanks 205 such as oxidizer tanks can be included within or attached to core structure 204. However, it should be appreciated that one or more additional propellant tanks 111 or other tanks such as oxidizer tanks may be provided within bus module 110.

FIG. 2 also shows how payload module 102 may be implemented with both payload outboard unit 214 and payload module panels 212. Each payload panel 212 may be arranged for mounting of payload module components on an interior side (e.g., on an inboard facesheet of panel 212) and may have a radiator surface (e.g., implementations of radiators 104 of FIG. 1) on an exterior side (e.g., formed by an outboard facesheet of panel 212). Bus module panels 210, mounted on opposing sides 200 and 202 of bus module body 201 (e.g., mounted to opposing sides of core structure 204) are also shown. Bus module panels 210 may each be arranged for mounting of bus module components on an interior side (e.g., on an inboard facesheet of the panel 210) and may each have a radiator surface on an exterior side (e.g., implementations of the radiators 112 of FIG. 1 formed by an outboard facesheet of the panel 210). Bus module 110 may also include external communications components such as antenna 208, attitude control components such as thruster 209 (e.g., that receive propellant from tank 206 and oxidizer from oxidizer tank 205), and power components such as solar array panels 211.

Figure 3:
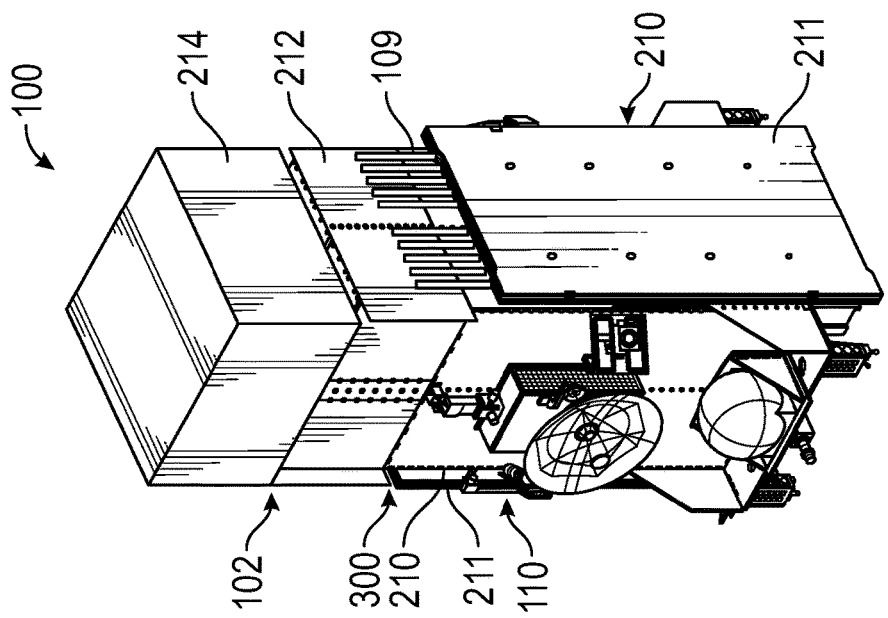
FIG. 3 illustrates a perspective view of a spacecraft having a bus module and a payload module after mating of the modules, in accordance with aspects of the disclosure.

Payload module 102 and bus module 110 are independent entities that may be manufactured, assembled, tested, and otherwise processed separately before being mated at an interface 300, such as a mechanical interface, prior to launch as shown in the configuration of FIG. 3. As shown in FIGS. 2 and 3, because height HBM of bus module 110 is larger is than height HPM of payload module 102, bus module panels 210 have a generally larger radiative area than payload module panels 212. For this reason, bus module 110 may have excess radiative capacity beyond what is needed for bus module operational components 118.

As shown in FIG. 3, thermal coupling components 109 may be implemented as external heat pipes that thermally couple payload module operational components 108, across interface 300, to bus module panels 210 (e.g. directly or via one or both of payload module thermal components 106 of payload module 102 and payload module thermal components 116 of bus module 110). For example, heat pipes within a panel 212 of payload module 102 may route heat from payload module operational components 108 to the radiator surface of panel 212 and/or to external heat pipes 109 which are thermally coupled to the radiator surface of bus module panel 210 (e.g., directly or via internal heat pipes within panel 210 of bus module 110).

External heat pipes 109, and/or internal heat pipes within bus module 110 that are thermally coupled to external heat pipes 109, are thermally isolated from internal heat pipes that are coupled to bus module operational components 118. In this way, excess radiative capacity on bus module 110 can be used to provide cooling for payload module 102 without affecting temperature control for bus module operational components 118.

Figure 5:
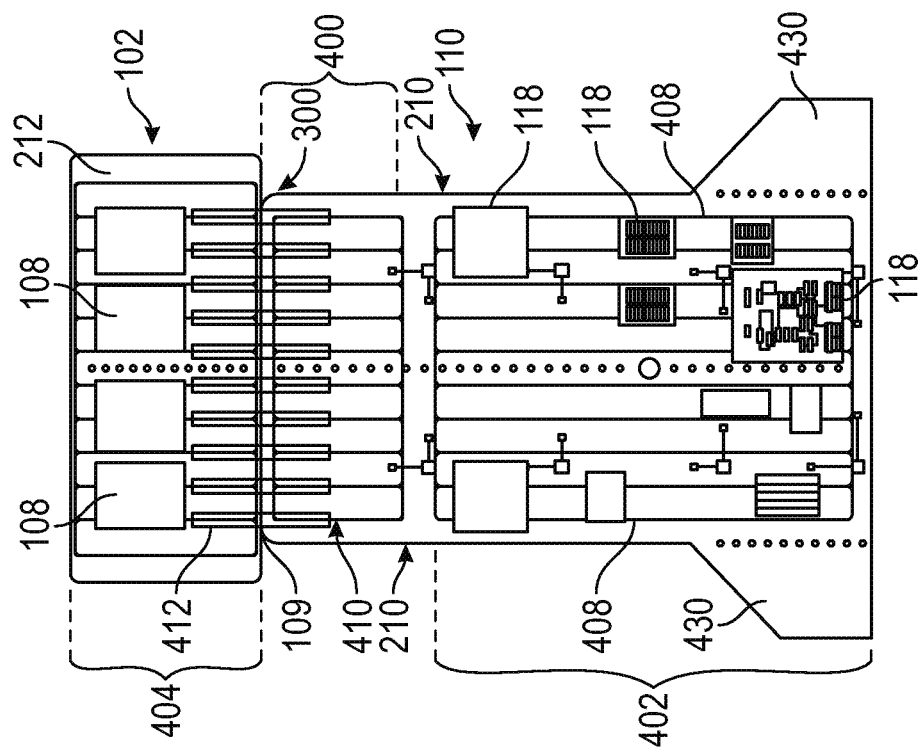
FIG. 5 illustrates a plan view of another equipment panel for a spacecraft having a payload module and a bus module with a bus-panel payload thermal zone in the bus module, in accordance with aspects of the disclosure.
Figure 4:
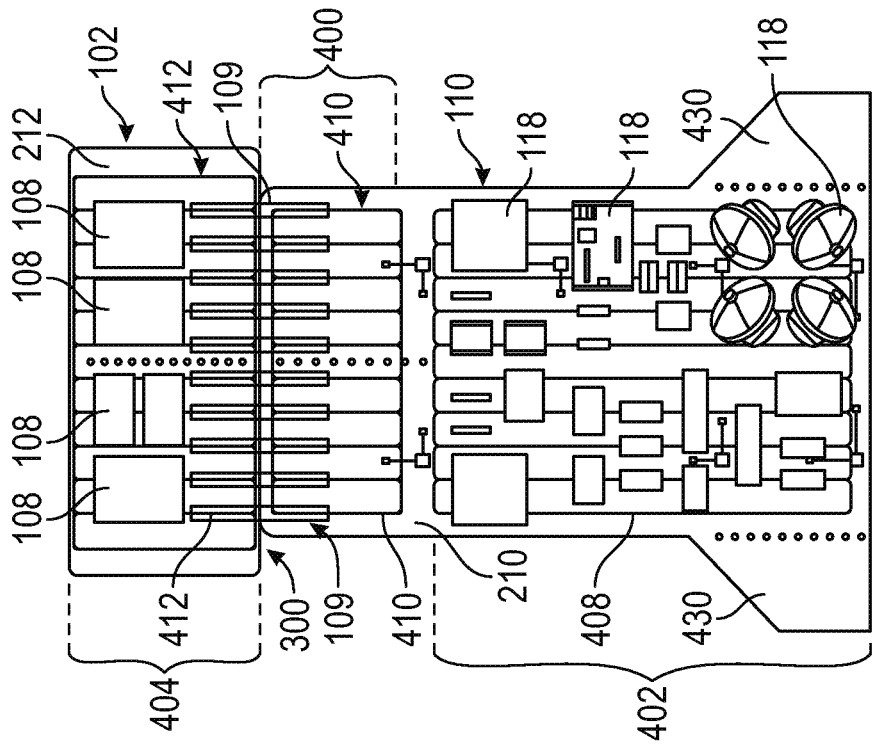
FIG. 4 illustrates a plan view of an equipment panel for a spacecraft having a payload module and a bus module with a bus-panel payload thermal zone in the bus module, in accordance with aspects of the disclosure.

FIGS. 4 and 5 show exemplary equipment panel layouts, respectively on sides 200 and 202 of spacecraft 100 in the configuration of FIG. 3, in which bus module 110 and payload module 102 are mechanically attached at interface 300 (e.g., using screws, bolts, clamps, or other attachment structures). As shown in the example of FIGS. 4 and 5, each bus module panel 210 is configured into two thermal zones: a bus thermal zone 402, which includes bus module operational components, and a bus-panel payload thermal zone 400 that is thermally isolated from bus thermal zone 402, and which is free of operational components (e.g., includes no electronic or communications equipment for bus module 110 or payload module 102).

In the examples of each of FIGS. 4 and 5, the inboard side of panels 210 and 212 is shown. In these examples, thermal routing structures 412 of payload module 102, thermal routing structures 408 and 410 of bus module 110, and thermal coupling structures 109 are visible on the inboard side of panels 210 and 212. However, it should be appreciated that thermal routing structures 412 of payload module 102 and thermal routing structures 408 and 410 of bus module 110 may be embedded, respectively, within panels 212 and 210 and that thermal coupling structures 109 may be disposed entirely on the outboard side of panels 212 and 210 (e.g., extending across interface 300 with a first portion opposite the outboard side of panel 212 and a second portion opposite the outboard side of panel 210).

As shown in the examples of FIGS. 4 and 5, bus-panel payload thermal zone 400 is thermally coupled to payload module 102 (e.g., to payload module operational components 108 directly or via payload module thermal components) when or after bus module 110 and payload module 102 are mechanically mated at interface 300. For example, the thermal coupling between bus-panel payload zone 400 and payload module 102 may be accomplished by adding external heat pipes 109 that bridge interface 300 and thermally couple to each of bus-panel payload zone 400 and payload module 102 after mating of the two modules.

In the example of FIGS. 4 and 5, payload module operational components 108 of payload module 102 are shown thermally coupled to payload module thermal structures such as a network of thermal routing structures (e.g., a network of payload module heat pipes 412) that are thermally coupled to payload module radiator 212 in payload module thermal zone 404 and to a network of payload-bus thermal routing structures such as a network of bus-payload heat pipes 410 in bus-panel payload thermal zone 400 in bus module 110. In this configuration, payload module operational components 108 may include one or more electronics units, processing components, communications components, or other payload-specific operational components thermally coupled to heat pipes 412.

In the example of FIGS. 4 and 5, payload module 102 may have a height of, for example, HPM inches and a width of HW inches. The maximum payload dissipation on a payload thermal radiator panel 212 may be, for example, DM Watts and the available north or south-facing radiator area may be denoted as PMRA square feet. With this radiator area, the predicted payload temperatures may be denoted as TPMP degrees. The predicted payload temperature TPMP may be well above the required payload temperature, which may be denoted as TPMR degrees. This upper limit temperature TPMR for payload module 102 may be established based on reliability requirements for payload module 102, where lower temperatures extend mission life and are generally desired for next-generation higher power and processing-intensive payloads. In this example, it may not be feasible to increase the payload module height HPM to obtain more radiator area, as the payload module 102 itself would then interfere with the launch vehicle fairing. Furthermore, such a height increase would be inefficient from a mass standpoint, increasing the required launch vehicle lift capability and cost.

In the example of FIGS. 4 and 5, bus module 110 may have a height of HBM inches and a width of WBM inches. The available radiator area for bus module 110 may be denoted as BMRA square feet per side, where BMRA is larger than PMRA. In the example of FIGS. 4 and 5, bus module operational components 118 of bus module 110 are shown coupled to a network of bus module thermal routing structures such as a network of bus module heat pipes 408 that are thermally coupled to bus module panel 210 in bus module thermal zone 402. In this configuration, bus module operational components 118 may include avionics, such as command and data handling (C&DH) equipment, telemetry, tracking, and control (TT&C) equipment, power electronics equipment, and power processing units such as one or more Hall Current Thruster (HCT Power Processor Units (PPUs)). In this example, the communications components, including modulators, de-modulators, up-converters, and related equipment are also included in the bus section.

In this example, a temperature limit TBMR for bus module 110 can be higher than temperature limit TPMR for payload module 102 because the bus components 118 may be qualified to operate at higher temperatures than the payload components 108. With the arrangement described in this example, limiting the temperatures for bus module 110 to TBMR degrees may use BMRU square feet of radiator area, which may be less than the available radiator area BMRA. Thus, excess bus radiator area is available, and the configuration of FIGS. 1-5 allows this excess bus radiator area to be accessible by the thermally disadvantaged payload module 102.

This accessibility to the excess bus radiator area is provided by a bus-panel payload thermal zone 400 in bus module 110 that includes a network of thermal routing structures such as the ten vertical heat-pipe pairs and two horizontal header heat pipes across the top and bottom in the example of FIGS. 4 and 5. This network of payload-accessible bus module heat pipes 410 are sized and arranged to be separate and thermally isolated from the bus module thermal zone 402.

In the example of FIGS. 4 and 5, payload thermal zone 404 includes a thermal routing network such as payload module heat pipe network 412 that has twelve vertical heat-pipe pairs with two header heat pipes across the top and bottom, again sized to fit within the radiator area of the payload equipment zone. As noted above, heat pipe network 412 and heat pipe network 410 may be thermally connected by direct thermal contact or by additional thermal coupling structures 109 such as external heat pipes that are attached to heat pipe network 412 and heat pipe network 410, to bridge interface 300, once the modules are mechanically mated (see, e.g., FIG. 3). In some examples, a cooling fluid may flow within and/or between heat pipes 410 and 412 (e.g., through external heat pipes 109). Bus-panel payload thermal zone 400 is thermally isolated from bus thermal zone 402, such that changes in the bus equipment layout or dissipation for bus module operational components have negligible effect on the payload temperatures. Also, the bus panels can be widened for additional radiator area, and the lower panel wings 430 can provide additional radiative area if desired.

In the example arrangement described herein in connection with FIGS. 1-5, at steady-state winter solstice with a sun angle of, for example, less than 5 degrees and with bus panels 210 coated with a reflective coating such as white paint, all payload electronics units in payload module 102 can operate simultaneously along with an HCT power processor unit in bus module 110 operating on each panel, with a maximum raw payload temperature of, for example, less than 30° C. (e.g., 25° C., or less than 25° C.) and a maximum raw bus temperature of, for example, less than 50° C. (e.g., 35° C., or less than 35° C.). This may be achieved without the use of deployable radiator panels and within the constraints of launch vehicle accommodation (e.g., a payload module height HPM of less than 88 inches and an overall spacecraft height of less than 300 inches).

In combination, FIGS. 3, 4, and 5 show how each of panels 210 (e.g., each of a North radiator/equipment panel and a South radiator/equipment panel) of bus module 110 spans bus module thermal zone 402 and bus-panel payload thermal zone 400. In combination, FIGS. 3, 4, and 5 also show how, on each side of spacecraft 100, thermal routing structures 408 and 410 can be disposed interior to the radiator surface of a bus module panel 210, thermal routing structures 412 may be disposed interior to the radiator surface of a payload panel 212, and thermal coupling structures 109 include first portions that are exterior to the radiator surface of bus module panel 210 and second portions that are disposed exterior to the radiator surface of payload panel 212 (in one suitable example). For example, thermal routing structures 408 and 410 may form thermally separate heat pipe networks within one of panel 210, thermal routing structures 412 may form a heat pipe network within panel one of panels 212, and thermal coupling structures 109 may be disposed exterior to the spacecraft body. Bus module 110 may include separate North and South-facing panels 210 and the described thermal zone and coupling arrangement may be implemented on each panel 210.

Although a particular arrangement of heat pipes for each of zones 400, 402, and 404 is shown in FIGS. 4 and 5, it should be appreciated that other thermal routing structures for zones 400, 402, and/or 404 are contemplated. For example, payload thermal zone 404 and bus-panel payload thermal zone 400 may be thermally connected in other ways such as using different numbers or arrangements of heat pipes, using thermal-mechanical joints, loop heat pipes, thermal straps or by other thermal coupling structures. Further, a bus-panel payload thermal zone 400 may be included on one side of the spacecraft or on multiple sides such as two opposing sides as in the example of FIGS. 4 and 5. In the case where a single side bus-panel payload thermal zone 400 is provided, that bus-panel payload thermal zone 400 may be configured to be accessible from both sides of payload module 102. For example, horizontal heat pipes may be provided that spread heat from side to side within spacecraft 100 during seasonal changes. Furthermore, bus-panel payload thermal zone 400 may be configured in such a way as to be accessible by internal panels (e.g., cruciform panels) of payload module 102 for even greater capability.

The description of the subject technology is provided to enable any person skilled in the art to practice the various aspects described herein. While the subject technology has been particularly described with reference to the various figures and aspects, it should be understood that these are for illustration purposes only and should not be taken as limiting the scope of the subject technology.

There may be many other ways to implement the subject technology. Various functions and elements described herein may be partitioned differently from those shown without departing from the scope of the subject technology. Various modifications to these aspects will be readily apparent to those skilled in the art, and generic principles defined herein may be applied to other aspects. Thus, many changes and modifications may be made to the subject technology, by one having ordinary skill in the art, without departing from the scope of the subject technology.

In one or more aspects, one or more configurations or components shown in one figure may be utilized with one or more other configurations or components shown in one or more other figures. For example, thermal zones 400, 402, and 404 may be utilized with respect to any of FIGS. 1-3.

Like reference numerals may designate like elements. For example, same reference numerals 100, 102, 108, 109, 110, 118, 200, 202, 210, and 212 are used in various figures for simplicity and convenience. These components with the same reference numerals have certain characteristics that are the same, but as different figures illustrate different examples, the same reference numeral does not indicate that a component with the same reference numeral has the exact same characteristics. While the same reference numerals are used for certain components, examples of differences with respect to a component are described throughout this disclosure.

It is understood that the specific order or hierarchy of steps in the processes disclosed is an illustration of exemplifying approaches. Based upon design preferences, it is understood that the specific order or hierarchy of steps in the processes may be rearranged. Some of the steps may be performed simultaneously.

It is noted that dimensional aspects (e.g., height, width) provided above are examples and that other values for the dimensions can be utilized in accordance with one or more implementations. Furthermore, the dimensional aspects provided above are generally nominal values. As would be appreciated by a person skilled in the art, each dimensional aspect has a tolerance associated with the dimensional aspect.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" means "serving as an example or illustration." Any aspect or design described herein as "exemplary" is not necessarily to be construed as preferred or advantageous over other aspects or designs. A reference to an element in the singular is not intended to mean "one and only one" unless specifically stated, but rather "one or more." The term "some" refers to one or more. The term "example" is sometimes used a noun and sometimes used as an adjective.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for." Furthermore, to the extent that the term "include", "have", or the like is used in the description or the claims, such term is intended to be inclusive in a manner similar to the term "comprise" as "comprise" is interpreted when employed as a transitional word in a claim.

What is claimed is:

1. A spacecraft, comprising:
 a payload module, including payload module operational components; and
 a bus module, wherein the bus module is attached to the payload module and includes:
  bus module operational components;
  a radiator structure;
  first thermal routing structures thermally coupling the bus module operational components to the radiator structure; and
  second thermal routing structures thermally coupling the payload module operational components to the radiator structure, wherein the second thermal routing structures are thermally isolated from the bus module operational components.

2. The spacecraft of claim 1, wherein the thermal coupling structures comprise external heat pipes that extend across a mechanical interface between the payload module and the bus module.

3. The spacecraft of claim 2, wherein:
 the radiator structure of the bus module comprises an outboard facesheet of an equipment panel of the bus module,
 the equipment panel of the bus module comprises an inboard facesheet to which the bus module operational components are mounted,
 the first and second thermal routing structures are embedded within the equipment panel of the bus module between the inboard facesheet and the radiator structure,
 a payload radiator structure comprises an outboard facesheet of an equipment panel of the payload module,
 the equipment panel of the payload module comprises an inboard facesheet to which the payload module operational components are mounted, and
 the thermal coupling structures include first portions that are disposed exterior to the radiator structure of the bus module and second portions that are disposed exterior to the payload radiator structure.

4. The spacecraft of claim 1, wherein the payload module operational components include at least one electronics unit and wherein the bus module operational components include an least one power unit and at least one attitude-control component.

5. A bus module for a spacecraft, the bus module comprising:
 a mechanical interface for coupling to a payload module;
 a radiator structure for dissipating heat to space;
 an operational component;
 a first thermal routing network arranged to route heat from the operational component to the radiator structure; and
 a second thermal routing network that is arranged to route heat to the radiator structure from the payload module and that is thermally isolated from the first thermal routing network and the operational component.

6. The bus module of claim 5, wherein the second thermal routing network is configured to route heat from the payload module to the radiator structure of the bus module when the payload module is attached to the mechanical interface.

7. The bus module of claim 6, wherein the first thermal routing network comprises a first plurality of heat pipes and wherein the second thermal routing network comprises a second plurality of heat pipes.

8. The bus module of claim 7, wherein the first plurality of heat pipes comprises a plurality of vertical heat pipes coupled together by at least one horizontal heat pipe.

9. The bus module of claim 8, wherein the second plurality of heat pipes comprises a plurality of additional vertical heat pipes coupled together by at least one additional horizontal heat pipe.

10. The bus module of claim 7, wherein the second plurality of heat pipes is configured to thermally couple to at least one external heat pipe for the spacecraft.

11. A spacecraft, comprising a bus module, the bus module comprising:
 a mechanical interface for a payload module; and
 an equipment panel having a radiator surface defining a first thermal zone and a second thermal zone, wherein the first thermal zone is configured to transfer heat from the bus module, and the second thermal zone, wherein the second thermal zone is thermally isolated from the first thermal zone and configured to be thermally coupled to the payload module when the payload module is attached at the mechanical interface.

12. The spacecraft of claim 11, wherein the bus module further comprises a bus module operational component in the first thermal zone and wherein the second thermal zone is free of operational components.

13. The spacecraft of claim 11, further comprising:
 the payload module; and
 a thermal coupling structure that thermally couples the payload module to the second thermal zone of the bus module.

14. The spacecraft of claim 13, wherein
 the bus module further comprises:
  a first network of heat pipes in the first thermal zone and coupled to the bus module operational component of the bus module, and
  a second network of heat pipes in the second thermal zone and thermally isolated from the first network of heat pipes.

* * * * *